(12) United States Patent
Kowalski

(10) Patent No.: US 6,470,044 B1
(45) Date of Patent: Oct. 22, 2002

(54) COMPUTATIONALLY PARSIMONIOUS FORWARD LINK RECEIVER FOR DS-CDMA SYSTEMS AND METHOD FOR SAME

(75) Inventor: John M. Kowalski, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 09/232,315

(22) Filed: Jan. 15, 1999

(51) Int. Cl.[7] ............... H04B 15/00; H04B 1/69; H04B 1/10
(52) U.S. Cl. ............ 375/148; 375/130; 375/140; 375/147; 370/201
(58) Field of Search ............... 375/347, 130, 375/285, 348, 350, 146, 147, 144, 346, 148, 140, 149; 708/670, 675; 370/201

(56) References Cited

U.S. PATENT DOCUMENTS

| | | | |
|---|---|---|---|
| 5,572,552 A | 11/1996 | Dent et al. | 375/343 |
| 5,727,032 A | 3/1998 | Jamal et al. | 375/347 |
| 6,097,763 A | * 8/2000 | Djokovic et al. | 375/260 |
| 6,154,484 A | * 11/2000 | Lee et al. | 375/130 |
| 6,219,391 B1 | * 4/2001 | Nakano | 375/346 |

OTHER PUBLICATIONS

Van Tress, Detection, Estimation, and Modulation Theory, Wiley, pp 23–36, 290–297, 1968.
S. Kay, Modern Spectral Estimation, Prentice Hall, 1988, pp. 23–25.
S. Kullback, Information Theory and Statistics, Wiley, 1958, pp. 196–197.
Papoulis, Signal Analysis, McGraw–Hill, 1997, pp. 327–328.

* cited by examiner

Primary Examiner—Chi Pham
Assistant Examiner—Dung X Nguyen
(74) Attorney, Agent, or Firm—David C. Ripma; Matthew D. Rabdau; Scott C. Drieger

(57) ABSTRACT

A receiver has been provided, with a pre-whitening filter, to improve the probability of recovering a received signal in the presence of colored noise. Colored noise can be multipath or transmission signals to other receivers in the same spectral bandpass. The receiver system uses colored noise statistics to provide an optimal estimation in the despreading of the transmitted information. Auxiliary systems in the receiver cancel the pilot, or system acquisition symbols, improving even further the probability or recovering information in the despreading of transmitted signal. A method of pre-whitening a signal received in the presence of colored noise is also provided.

18 Claims, 3 Drawing Sheets

100 CHIPS/BIT (NO FEC)
OVERSAMPLING FACTOR OF 2
500 SYMBOL (BIT) ESTIMATION PERIOD OF COVARIANCE MATRIX

COMPUTATIONALLY PARSIMONIOUS FORWARD LINK RECEIVER FOR DS-CDMA SYSTEMS AND METHOD FOR SAME

BACKGROUND AND SUMMARY OF THE INVENTION

This invention relates generally to wireless communications systems and, more specifically, to a system and method for improving the signal to noise ratio of Code Division Multiple Access (CDMA) communications by filtering colored noise.

Spread spectrum communication techniques allow communicating users to operate in noisy radio frequency (RF) spectrums, and are especially effective against narrow-band interferers. Spread spectrum communications can be effected at relatively low power spectral densities, and multiple users can share the same frequency spectrum. Further, receivers can be designed to protect against multipath. These system characteristics encouraged early development of the technology by the military.

Direct Sequence systems spread a digital stream of information, typically in a phase shift keyed modulation format, with a PN code generator, to modulate a carrier signal. The pseudonoise sequence of the PN code generator is periodic, and the spread signal can be despread in a receiver with a matching PN code. Direct Sequence systems have excellent immunity to noise. The PN codes used typically permit a large number of users to share the spectrum, with a minimum of correlation between the user's PN codes. However, Direct Sequence system require large RF bandwidths and long acquisition times.

The IS-95 standard defines key features of the so-called second generation code division multiple access (CDMA) communication system, a type of Direct Sequence spread spectrum modulation. To help solve the problem of long acquisition time, the IS-95 signal uses a pilot channel. Each base station transmits a pilot channel message spread with PN codes known to all the mobile stations. The PN code is made up a series of phase shifted binary symbols called chips. The PN period is 32,768 chips and the PN chip rate is 1.2288 Megahertz (MHz). The digital stream of information that is spread by the PN code is also known to the mobile stations. Because there is no ambiguity in the demodulated message, the timing characteristics of the PN code, down to the chip phase, as well as the QPSK modulation phase are known to the mobile station receiver.

The IS-95 system communicates information from the base station to the mobile stations through a series of traffic channels. These traffic channels are transmit and receive information, i.e. digitized audio signals, spread with a traffic channel PN code, unique to each mobile station. Using this precise timing and phase information derived from the pilot channel, the mobile station is able to acquire a setup channel, and eventually, the overall System Time. With this System Time, the mobile station is able to differentiate between base stations and synchronize the demodulation circuitry with sufficient accuracy to recover the received traffic channel message.

A third generation, wideband CDMA (W-CDMA) system is in development as described in "Wideband-CDMA Radio Control Techniques for Third Generation Mobile Communication Systems", written by Onoe et al., IEEE 47$^{th}$ Vehicular Technology Conference Proceedings, May 1997, that may have global applications. Instead of a pilot channel, the W-CDMA system has a broadcast, or perch channel. Each timeslot, or slot of the broadcast channel consists of a series of time multiplexed symbols. A long code masked, or special timing symbol segment uses just a short code to spread one symbol of known information. This segment allows a mobile station to acquire system timing information immediately after turn-on. The pilot, or reference symbols are similar to the IS-95 pilot channel. In one proposal, 4 reference symbols, with each symbol being 2 bits, are spread with a long code and a short code. The reference symbol information and the short code are known by the mobile stations. The long code is unique to each base station, so that timing information is refined, once the long code is known (the base station is identified). Therefore, according to some proposals, 5 symbols in the slot would be dedicated to the mobile station acquiring timing information. Further, both the long and short codes spread 5 symbols of data during each slot. Since information is not predetermined for the data symbols, precise timing information cannot be accurately recovered, as with the other two kinds of (timing) symbols. Other combinations of reference, special timing, and data symbols are also possible.

The W-CDMA system also includes several traffic channels to communicate information, such as a digitized voice or data. The traffic channel predominately includes information, but may also include a reference symbol segment. For example, at a data rate of 32 kilosymbols per second (ksps), a slot could include 4 pilot symbols and 16 information symbols. Precise timing information can be derived during the reference symbols segment of the traffic channel message, but not during the information segments.

The W-CDMA system, or any spread spectrum system, operates best by minimizing the transmitted power of the users, within the constraints of maintaining a fixed bit error rate (BER). Lower spectral power densities permit additional users to be added to the system, or an increase in the signal to noise ratio of received messages. Each mobile station is likely to receive more than one traffic channel from a base station, with each traffic channel being unique to a mobile station. That is, each base station is capable of transmitting hundreds of different traffic channels, the exact number is dependent on the traffic channel data rates. However, each base station transmits only a few, perhaps only one, broadcast channels that are used by all the receiving mobile stations. It is advantageous for the system that the base stations transmit the shared broadcast channels at a higher power level than the mobile station specific traffic channels. For this reason, the broadcast channel power is maintained at a relatively high level, while the traffic channel levels are continually monitored and adjusted to keep the transmitted power levels only as large as necessary to reasonably enable communication between the base station and the mobile.

Regardless of whether the broadcast channel power can be minimized, communications to others receivers in the system, and the broadcast channel, especially the long code masked pilot symbols, all add energy to the transmission spectrum which appears as noise to any specific receiver attempting to recover traffic channel information. Since this colored noise largely comes from a common transmitter, it is not uniformly or randomly spread across the spectrum, as is white noise.

Dent et al., U.S. Pat. No. 5,572,552, discloses a method of maximizing the SNR and canceling inter-chip interference, but it is computationally intensive. That is, it relies on subsystems not existing currently in receivers. The use of a forward link receiver is discussed using the same tap locations as a RAKE receiver. However, little mention is made of how those paths are computed. Neither is a means given for integrating such a filter with a conventional baseband receiver, such as in IS-95, or that used in the ETSI/ARIB (European Telecommunications Standards Institute/ Association of Radio Industries and Businesses) proposals for IMT-2000 (International Mobile Telecommunications). No method for subtractive cancellation of a pilot signal, which on the forward link, is often relatively strong. Further, no mention of the use of multiple pilot signals or slotted pilot signals such as those proposed for third generation systems.

Jamal, et al., U.S. Pat. No. 5,727,032, discusses a least mean square (LMS) algorithm for estimating channel coefficients. This method is well known to converge to channel estimates faster, as the LMS algorithm's convergence depends on the ratio of the covariance matrix's eigenvalues. It also does not appear to address the colored noise problem, focusing on using this algorithm solely for channel impulse response estimation.

Kowalski et al, Ser. No. 09/048,240, entitled "Pilot Aided, Time-Varying Finite Impulse Response, Adaptive Channel Matching Receiving System and Method", filed Mar. 25, 1998, and assigned to the same assignees as the instant application, discloses the use of finite impulse response (FIR) filters used to maximize the signal to noise ratio of a multipathed signal by combining delayed signals before the process of correlation.

A. Papoulis (*Signal Analysis,* McGraw-Hill, 327–328, 1977) suggests the use of approximations to matched filter receivers. However, the combination of such a receiver with channel estimation in colored noise, and with complex values, and the application to DS-CDMA handset receivers is novel.

It would be advantageous if RAKE receiver channel estimates could be calculated to maximize the signal to noise ratio of CDMA traffic channel communications in the presence of colored noise.

It would be advantageous if the tracking and searching algorithms already present in IS-95, and $3^{rd}$ generation CDMA systems could be used to minimize the detrimental effects of colored noise.

It would be advantageous if pilot symbols could be eliminated from the received communications, for the purpose of recovering traffic channel information, increasing the effective signal to noise ratio.

Accordingly, in a code division multiple access (CDMA) communication system including at least one base station transmitting information to a mobile station, a method has been provided for removing colored noise from received communications. The method comprising the steps of:

a) receiving communications including information, colored noise, and white noise;

b) in response to the communications received in Step a), generating a pre-whitening filter to reduce the colored noise; and c) performing channel weighting and demodulation of the received communications, filtered in Step b), to recover the transmitted information. In this manner, the received communications are selectively emphasized to compensate for the colored noise.

CDMA communications are received along a plurality of transmission paths with corresponding path delays. Step a) includes resolving the timing of the received communications associated with each transmission path. Then, Step b) includes the sub-steps of:

1) forming a functional for each transmission path based on the received noise and the timing of each transmission path resolved in Step a); and 2) in response to each functional formed in Step b)1), determining the pre-whitening filter for the colored noise of each corresponding transmission path.

Specifically, Step b)1) includes the functional as follows:

$$J = \alpha^H R \alpha - \lambda [\alpha^H f - y_0];$$

in which $\alpha$ represents the pre-whitening filter;

in which $(\ )^H$ denotes a conjugate transpose;

in which R is the noise covariance matrix;

in which J is the functional value;

in which $y_0$ is a constant;

in which f is the received communication; and in which $\lambda$ is a non-zero LaGrange multiplier.

CDMA transmissions typically include a pilot signal. Step a) includes receiving the pilot symbol as part of the received communications. A further step follows Step a) of:

$a_1$) in response to receiving the pilot symbol in Step a), creating a pilot symbol replica;

Then, Step b) includes using the pilot symbol replica to cancel the received pilot signal from received communications and colored noise, whereby the pre-whitening filter is optimized, and Step c) includes subtracting the pilot symbol replica from the received communications to provide a channel estimate without the effects of the pilot symbol, whereby the pilot symbol is filtered as colored noise.

In a code division multiple access (CDMA) communication system including at least one base station transmitting information to a mobile station, a receiver for maximizing the signal to noise ratio in the presence of colored noise is also provided. The receiver comprises an autocovariance estimator to receive the transmitted communications including information, colored noise, and white noise, and to provide a covariance matrix of noise statistics. A pre-whitening filter having an input operatively connected to the output of the autocovariance estimator and provides the optimal estimation vector in response to the covariance matrix. A RAKE receiver accepts the transmitted communications including information, white noise, and colored noise, as well as the optimal estimation vector. The RAKE receiver uses the optimum estimation vector to provide despread received information at an output, whereby the probability of receiving information is improved.

In some aspects of the invention, the CDMA system includes transmission of a pilot symbol to aid in synchronization and timing. A pilot symbol replica generator accepts information to determine the occurrence of the pilot symbols and provides a pilot symbol replica at the same time that an actual pilot symbol is received. A subtractor circuit accepts the received signal and the pilot symbol replica. The received signal without the pilot symbol is then input into the autocovariance estimator. The autocovariance estimator is able to provide a vector in the matrix of noise statistics which effectively filters colored noise from the received signal.

DETAILED DESCRIPTION OF THE PREFERRED EMBODIMENT

Figure 1:
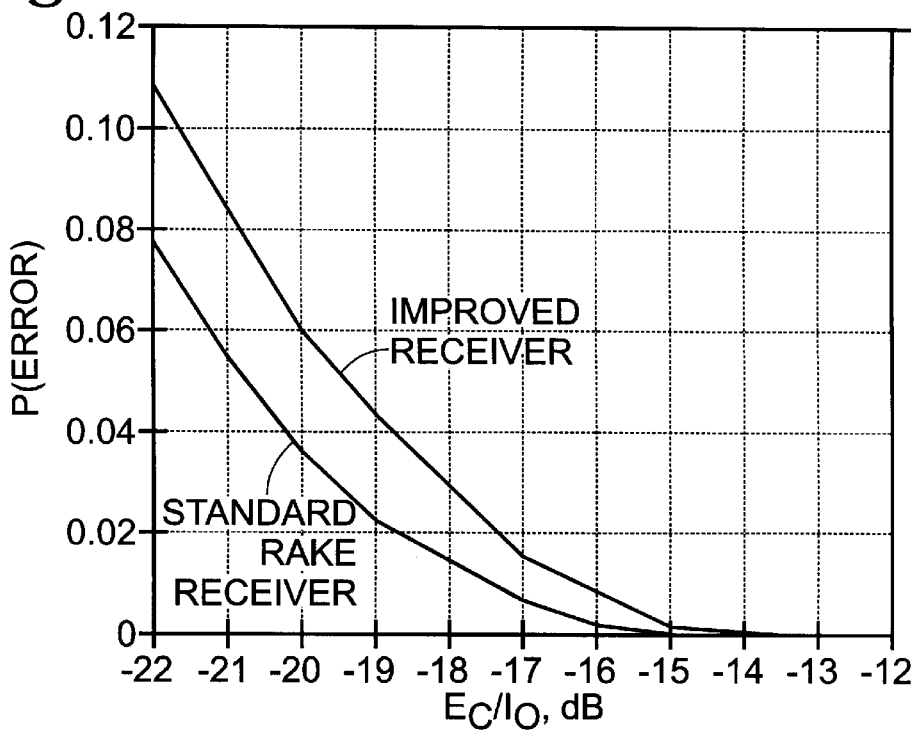
FIG. 1 is a graph plotting the results for the JTC (Technical Report on RF Channel Characterization and System Deployment Modeling, JTC AIR/94.0923-065R6, Sep. 23, 1994) indoor residential "Channel B" model.

It is well known [Van Trees, *Detection, Estimation, and Modulation Theory*, Wiley, 290–297, 1968] that the optimum receiver for signals in colored noise is given by a pre-whitening filter followed by a filer matched to the resulting filtered desired signal. The novelty of the present invention is in the application this concept to CDMA signals transmitted on the forward link. The present invention uses a computationally parsimonious means to implement this receiver, using as currently implemented subsystems. Simulation results indicate a greater than 1dB improvement in output signal to noise ratio, as compared with the standard RAKE receiver, using present invention channel models.

The optimum receiver for the detection of signals passed through a channel $H_s(\omega)$ in the presence of colored noise with power spectrum $H_N(\omega)$ is presented. The additive noise is pre-whitened by passing the received signal r(t) through a filter which is the inverse filter of $H_N(\omega)$. That, is the filter has frequency response as follows:

$$H_p(\omega) = \frac{1}{\sqrt{H_N(\omega)}} \quad (1)$$

Then, the resultant signal is matched to $H_s(\omega) H_p(\omega)$, i.e., the resultant is filtered through $H_s^*(-\omega) H_p^*(-\omega)$. The objective is to describe a suboptimal, computationally parsimonious adaptive system which approximates the above operations, for application to cellular CDMA coherent communications, in which a pilot signal or slotted sequence of pilot symbols is present in the received signal component. Typical prior art systems do not make use of pilot signal cancellation techniques, which would bias covariance matrix estimation. The present invention system and method use existing baseband processing algorithms, specifically, ones used in a standard IS-95 RAKE receiver.

The received signal is of the form:

$$r(t) = \sum_k b_k s(t - T_k) + n(t), \quad (2)$$

where $n(t)=n_w(t)+n_c(t)$ is the interference with $n_w(t)$ and $n_c(t)$ the white and colored components of the noise, respectively. There are assumed to be K+1 channel coefficients. As usual in such problems, $E[n(t)]=E[n_w(t)]=E[n_c(t)]=0$. It is assumed that n(t) has autocorrelation (or autocovariance) function $R(\tau)$. Also, s(t) is the desired signal and $$\sum_k b_k \delta(t - T_k)$$

is the channel impulse response. The coefficients $\{b_k\}$ and $\{T_k\}$ are in general time varying, although this time-dependency is suppressed here. If the channel is varying "slowly enough", then for analysis and measurement purposes, the channel will behave as a linear time invariant (LTI) channel.

Since it is assumed that the underlying statistics are Gaussian, a detection statistic based upon a maximal signal to noise ratio will result in an optimal receiver in the Neyman-Pearson [Van Trees, *Detection, Estimation, and Modulation Theory*, 33–34, 1968.] sense. Optimum receiver performance is based on the knowledge of received multipath returns, as in standard RAKE, IS-95 receivers. While performance of the present invention is theoretically degraded relative to the optimal RAKE receiver, the performance degradation is minimized by the fact that the finger searcher searches out those regions in time where the signal is located. Simulations, presented below, support this conclusion.

Thus, a filter is sought with impulse response h(t) such that:

$$h(t) = \sum_k a_k \delta(t - T_k) \quad (3)$$

where the $\{T_k\}$'s correspond to delays identified by the "finger searcher" and tracked with a tracker, and the signal to noise ratio at a given time to is maximized.

Note that in general, $\{a_k\}$ and $\{b_k\}$ are complex as are the (basebanded) inputs n(t) and the desired signal s(t).

From formula 3, above, the filter is a moving average filter, similar to standard RAKE receivers. This guarantees numerical stability, which, for the "true" optimum receiver, is difficult, because in general, an IIR (infinite impulse response) filter is required.

The maximum SNR is defined as follows: let $$f(t) = \sum_k b_k s(t - T_k) \quad (4)$$

representing the desired signal component as distorted by the channel, $$y(t) = r(t) * h(t) = y_f(t) + y_n(t) \quad (5)$$

where $y_f(t)$ is the output of the filter due to f(t), and $y_n(t)$ is the output of the filter due to the interference.

Also, let $$b = \begin{bmatrix} b_0 \\ \vdots \\ b_K \end{bmatrix}, \quad (6)$$

$$a = \begin{bmatrix} a_0 \\ \vdots \\ a_K \end{bmatrix}, \quad (7)$$

$$f = \begin{bmatrix} f(t_0 - T_0) \\ \vdots \\ f(t_0 - T_K) \end{bmatrix}. \quad (8)$$

At $t=t_0$, $$|y_f(t_0)|^2 = a^H f f^H a \quad (9)$$

where $^H$ denotes conjugate transpose and the bold text represents a matrix or vector. The average power out of the filter due to interference may be expressed as:

$$E[|y_n(t)|^2] = \sum_{k_1, k_2} a_{k_1} R(T_{k_1} - T_{k_2}) a_{k_2}^* \quad (10)$$

-continued $$= a^H Ra,$$

with R a covariance matrix at the above specified delay differences. Hence, the problem is to maximize:

$$J = \frac{a^H ff^H a}{a^H Ra} \quad (11)$$

The solution to this problem must be such that $$ff^H a = \lambda_{max} Ra$$

where $\lambda_{max}$ is the largest eigenvalue corresponding to $R^{-1}ff^H$ (S. Kullback, *Information Theory and Statistics*, Wiley, 1958).

The optimum a then is the eigenvector associated with $\lambda_{max}$. Algorithms to find eigenvalues of symmetric matrices are well known (See for example, Golub and Van Loan, *Matrix Computations*, Second Edition, John Hopkins University Press, 1989, pp. 409–475). Extensions to algorithms for complex matrices are easily derived, commercially available mathematics software programs compute complex matrix eigenvalue problems this way.

If the signal is corrupted by a channel with impulse response $H_2(w)$, then, the figure of merit becomes, $$J' = \frac{a^H h_2 s(h_2 s)^H a}{a^H Ra} \quad (12)$$

where $h_2$ represents the channel impulse response, and s represents the signal vector. The solution to this problem, from the foregoing, must be such that $$h_2 s s^H h_2^H = \lambda_{max} Ra, \quad (13)$$

where $\lambda_{max}$ is the largest eigenvalue corresponding to $h_2 s s^H h_2^H R^{-1}$. The coefficients for $h_2$ can be found via the standard Rake receiver, since, even if the noise is imperfectly pre-whitened, the standard RAKE "channel estimator" will still be an unbiased estimator for the channel, i.e., $h_2$. Furthermore, the performance can be shown to be, for the optimal receiver (i.e., the true inverse filter), nearly equivalent to performance in additive white Gaussian noise (AWGN) assuming the signal energies in both cases are matched, for CDMA signals. Although not described here, this result follows from a Karhunen-Loeve (Van Trees, *Detection, Estimation, and Modulation Theory*, 297–299, 1968.) expansion of the signal and noise, and then showing that the resultant additional noise (above the interference) comes from inter-chip interference, which is typically small compared to multiple access noise.

An alternative derivation, following Papoulis (A. Papoulis, *Signal Analysis*, McGraw-Hill, 327–328, 1977), is as follows, which also has less computational complexity, and greater numerical robustness. Instead of maximizing the performance measure J or J' above, we minimize the noise subject to a constraint on the filter weighing; therefore, the optimization criterion seeks to minimize $a^H Ra$ subject to $a^H f = y_0$ = constant. The modified performance measure becomes (using LaGrange multipliers):

$$J = a^H Ra - \lambda [a^H Ra - y_0]. \quad (14)$$

The solution to the above is found by taking the gradient, as usual., and recognizing that the value of the LaGrange multiplier X is arbitrary (although non-zero). This yields:

$$a = \frac{1}{2} R^{-1} f. \quad (15)$$

(The factor ½ is arbitrary). The extension to multi-cell/sector systems, with the performance measure J' above is straightforward (f becomes $h_2 s$ as above). Inversion of symmetric matrices is also well known. The simplest method, apart from brute force, is Cholesky Decomposition (See Golub and Van Loan, Matrix Computations, Second Edition, John Hopkins University Press, 1989, pp. 142–145). The derivation given is for real matrices, however, an identical derivation exists for complex matrices.

This represents the preferred embodiment of the system, since eigenvalue computations can be corrupted by additive noise, and the above equation can be iteratively updated.

It is often necessary to subtract the pilot signal, or a replica, the input signal. This will be the case when the system is lightly loaded, as the pilot signal will in general be received at a substantially higher level (7 dB, e.g., in IS-95 and related systems) than traffic signals. If this is necessary, the RAKE coefficients of the standard RAKE receiver may be used to perform such a cancellation. The pilot signal is reconstructed, weighted via the RAKE coefficients, and subtracted from the input signal plus noise.

FIG. 1 is a graph plotting the results for the JTC (Technical Report on RF Channel Characterization and System Deployment Modeling, JTC AIR/94.0923-065R6, Sep. 23, 1994) indoor residential "Channel B" model. The Doppler variation of the channel is assumed negligible for these results, and since the traffic is pedestrian, this is a reasonable assumption. This assumption effects the number of samples in which the covariance matrix can be estimated, however, using an approach such as the Matrix Inversion Lemma, which iteratively updates a covariance matrix (S. Kay, *Modern Spectral Estimation:* Theory and Application, Prentice-Hall, 23–25,1988.), the effects of time varying channel parameters can be mitigated.

FIG. 1 shows the bit error rate of an uncoded QPSK CDMA system utilizing the standard RAKE receiver, and the improved RAKE receiver. The simulation utilizes 100 chips per bit, with oversampling of the system by a factor of twice the chip rate. A 500 symbol (5 ms) estimation period of the covariance matrix is assumed, and the number of trials was 10000. The results clearly show that in the region typically of interest for such systems, i.e., an uncoded bit error rate from 1% and above, more than 1 dB of improvement is obtained, which directly translates to transmitted power, range, or decreased bit error rate.

Figure 2:
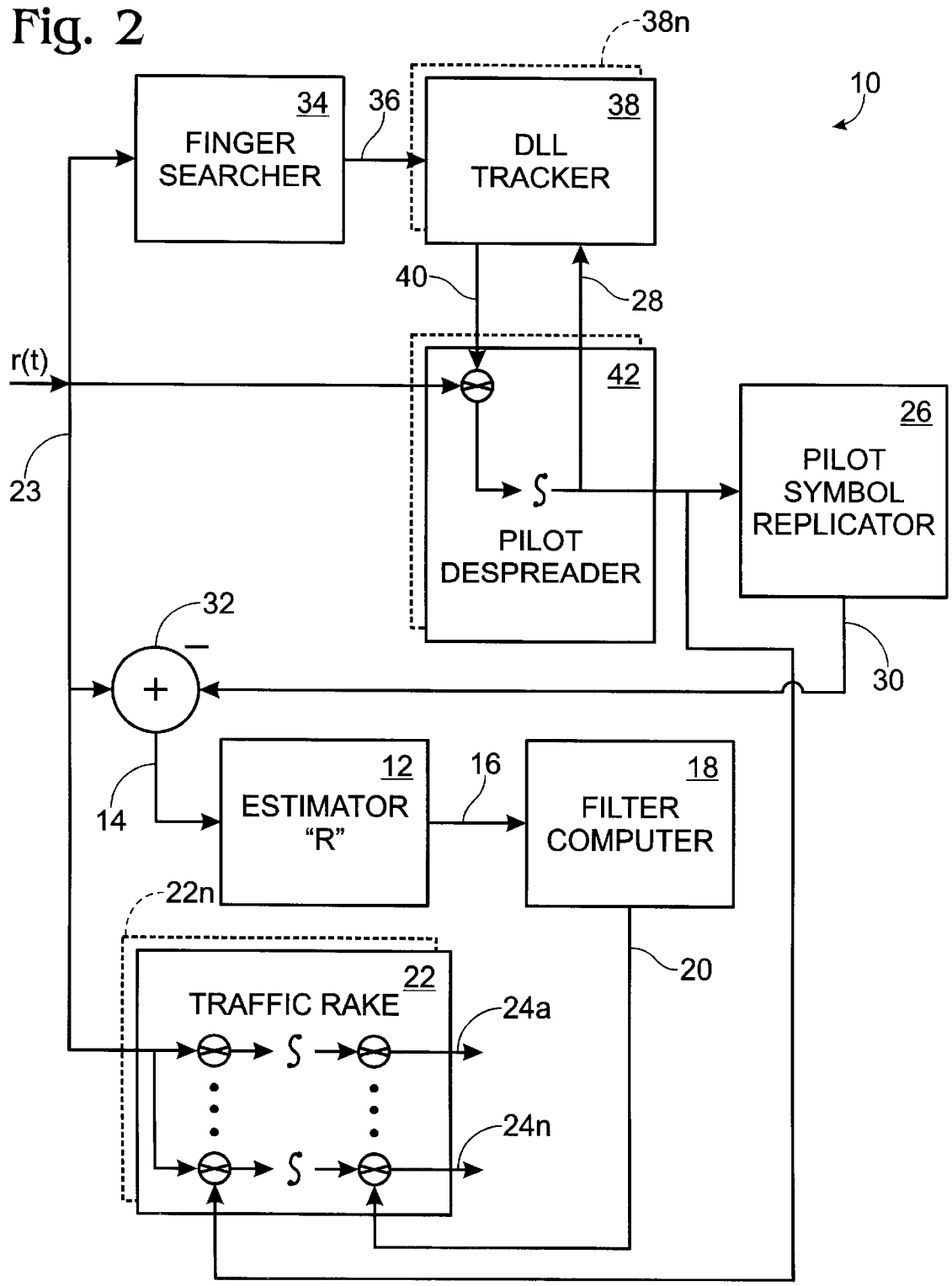
FIG. 2 is a schematic block diagram of a receiver for maximizing the signal to noise ratio in the presence of colored noise.

FIG. 2 is a schematic block diagram of a receiver for maximizing the signal to noise ratio in the presence of colored noise. Receiver 10 operates in a multiple access communications system, such as a code division multiple access (CDMA) communication system, including at least one base station transmitting information to a mobile station. Alternately, the same principles of operation apply to the base station receiver, especially for Time Division Duplex (TDD) systems. For Frequency Division Duplex (FDD) systems, the system is applicable at the base station with channel information fed back from the mobile.

To receive multiple access type communications in the presence of multipath, in which the information transmission rate is small compared to the transmission bandwidth (the information bandwidth is large compared to the information rate), a RAKE receiver is generally required. The RAKE receiver processes signals based on the assumption that the multipath returns are resolvable. That is, the two received multipath signals are delayed by a time interval large compared to the inverse of the transmission bandwidth.

For a CDMA system, this implies that the chip interval is smaller than the delay spread of multipath returns.

If, in a CDMA or time division multiple access (TDMA) system, received multipath signals are not delayed by a time interval large compared to the inverse of the transmission bandwidth. Then, in general, there will be interchip (or intersymbol) interference. In such a case, an equalizer is used, whose purpose essentially is to inverse filter (correct for the effects of) the channel impulse response.

So, essentially the purpose of the equalizer and RAKE receiver are the same, even if the RAKE receiver's operating assumptions are different from those of an equalizer.

An autocovariance estimator 12 has a first input to receive the transmitted communications including information, colored noise, and white noise on line 14, and an output on line 16 to provide a covariance matrix of noise statistics.

A pre-whitening filter computer 18 has an input operatively connected on line 16 to the transmitted communications including information, white noise, and colored noise, through the output of autocovariance estimator 12. Filter computer 18 has an output on line 20 to provide the optimal estimation vector for despreading the information in response to receiving the transmitted information and colored noise. That is, to provide the optimal estimation vector in response to the covariance matrix.

A receiver 22 in a CDMA system, has a first input on line 23 to accept the transmitted communications including information, white noise, and colored noise, and a second input operatively connected to pre-whitening filter computer output 18 on line 20. Receiver 22 is similar to a RAKE receiver, with different weighting. For simplicity, receiver 22 will be referred to herein as a RAKE. The dotted line shadowing RAKE receiver 22, labeled 22n represents a plurality of n possible RAKE receiver sections. RAKE receiver 22 uses the optimum estimation vector to provide despread received information at an output, actually a plurality of outputs 24a and 24n, representing n multipath signals being tracked. Not shown is a combiner following the RAKE receiver where the multipath signals on lines 24a through 24n are combined and weighted. The use of the optimal estimation vector, from pre-whitening filter 18, improves the probability of receiving information.

Typically, the CDMA system includes transmission of a pilot symbol to aid in synchronization and timing. Then, receiver 10 includes a pilot symbol replica generator 26 having an input on line 28 to accept information to determine the occurrence of the pilot symbols and an output on line 30 to provide a pilot symbol replica at the same time that an actual pilot symbol is received.

A subtractor circuit 32 has a first input on line 14 to accept the received signal, a second input operatively connected to the output of pilot symbol replica generator 26 on line 30, and an output, operatively connected to the input of autocovariance estimator 12 on line 14 to provide the received signal without the pilot symbol.

Autocovariance estimator 12 is able to provide a vector in the matrix of noise statistics which effectively filters colored noise from the received signal.

In some systems, such as a CDMA system, the information is transmitted on a traffic channel spread with a long code, and predetermined data symbols are transmitted on a pilot channel spread with the long code, for the purposes of channel acquisition and synchronization. Receiver further comprises a finger searcher unit 34 having an input on line 23 to accept the transmitted pilot channel, and to provide the long code used to despread the channels at an output on line 36.

A tracking loop, code locked-loop, or digitally locked-loop (DLL) 38 has a first input operatively connected to said finger searcher output on line 36 and a second input on line 28 to receive the transmitted pilot channel. Loop 38 provides a synchronized long code at an output on line 40.

A pilot channel despreader 42 has a first input on line 23 to accept the transmitted pilot channel, a second input operatively connected to the output of tracking loop 38 on line 40, and an output on line 28 to provide the despread pilot channel.

In some aspects of the invention, autocovariance estimator 12 is able to provide a matrix of noise statistics as follows:

$$R((i-j)T_s) = \frac{1}{K-|i-j|} \sum_{k=1}^{K-|i-j|} r(kT_s + (i-j)T_s)r^*(kT_s) \quad (16)$$

in which

R is the autocovariance estimate;

$T_s$ is the sampling period;

i, and j represent the i-th row and j-th column of the estimated autocovariance matrix;

K represents the number of samples from which the autocovariance is estimated; and and r(t) represents the received communication including information and interference at time t, whereby the i-th row and j-th column in the autocovariance matrix are the estimated values $R((i-j)T_s)$.

In some aspects of the invention, pre-whitening filter computer 18 provides an estimation vector as follows:

α such that $J=(\alpha^H f f^H \alpha)/(\alpha^H R \alpha)$ is maximum;

α such that $J=\alpha^H R \alpha - \lambda[\alpha^H f - y_0]$ is minimum;

and in which α represents the pre-whitening filter;
in which $( )^H$ denotes a conjugate transpose;
in which R is the interference covariance matrix;
in which J is the functional;
in which a represents the pre-whitening filter;
in which $y_0$ is a constant;
in which f is the received communication; and
in which λ is a non-zero LaGrange multiplier.

Figure 3:
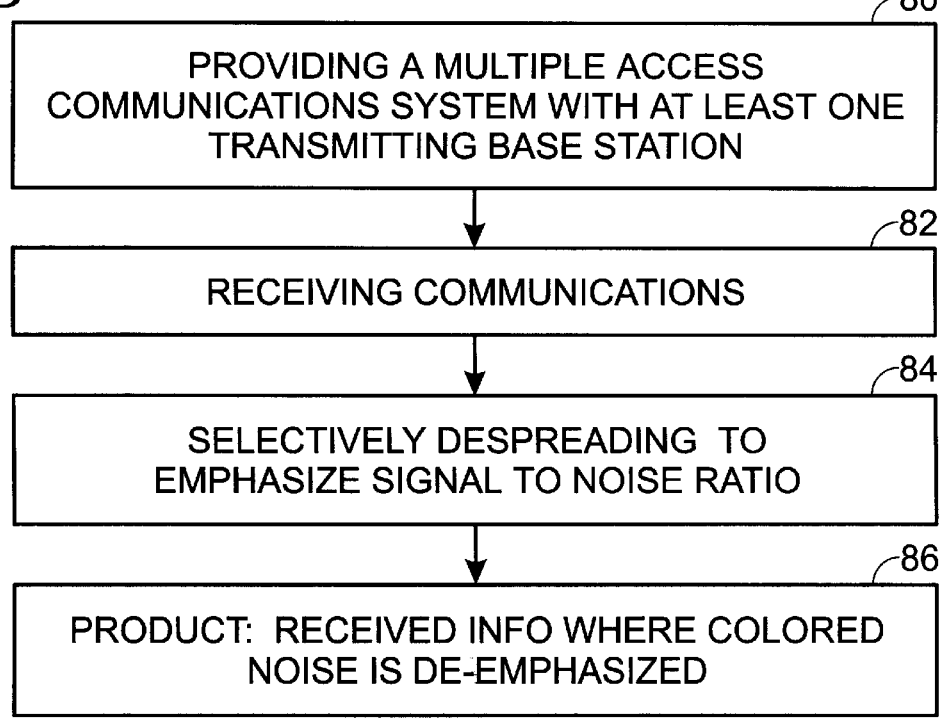
FIG. 3 is a flowchart illustrating a method for removing colored noise from received communications.

FIG. 3 is a flowchart illustrating a method for removing colored noise from received communications. Step 80 provides a multiple access communications system, such as a code division multiple access (CDMA) communication system, including at least one base station transmitting information to a mobile station. Code Division multiple access systems are a special case of a more general form of multiple access communication systems. Multiple access communication systems allow a plurality of users to communicate simultaneously, by allocating time and bandwidth in a method unique to each users. DS-CDMA systems do this by allocating different spreading codes to different users; TDMA systems allocate time slots to each user.

There are other techniques for multiple access as well, including frequency hopping spread spectrum, orthogonal frequency division multiplexing, etc. Whenever these techniques allocate a signaling bandwidth that is large compared to the information transfer rate, and whenever the reciprocal of the bandwidth small compared to the delay spread of the channel, a multipath combining receiver will be required for optimal demodulation.

Step 82 receives communications including information, colored noise, and white noise. Step 84 selectively weights the despread received communications to emphasize the signal to noise ratio. Step 86 is a product, where the colored noise is de-emphasized in despreading of the received information.

In some aspects on the invention, Step 80 provides that the communications are received within a plurality of time segments. Then, Step 84 includes selectively weighting time segments when the received communications are despread. Alternately stated, Step 80 provides that the communications are received across a spectrum of frequency bandwidth. Then, Step 84 includes selectively weighting portions of the frequency spectrum when the received communications are despread. In some aspects of the invention, Step 82 includes the received communication information and noise components varying, in response to fading, interference, obstructions, and atmospheric conditions, as is typical with any wireless communications. Then, Step 84 includes adaptively modifying the selective weighting process in response to the varying received communications.

Figure 4:
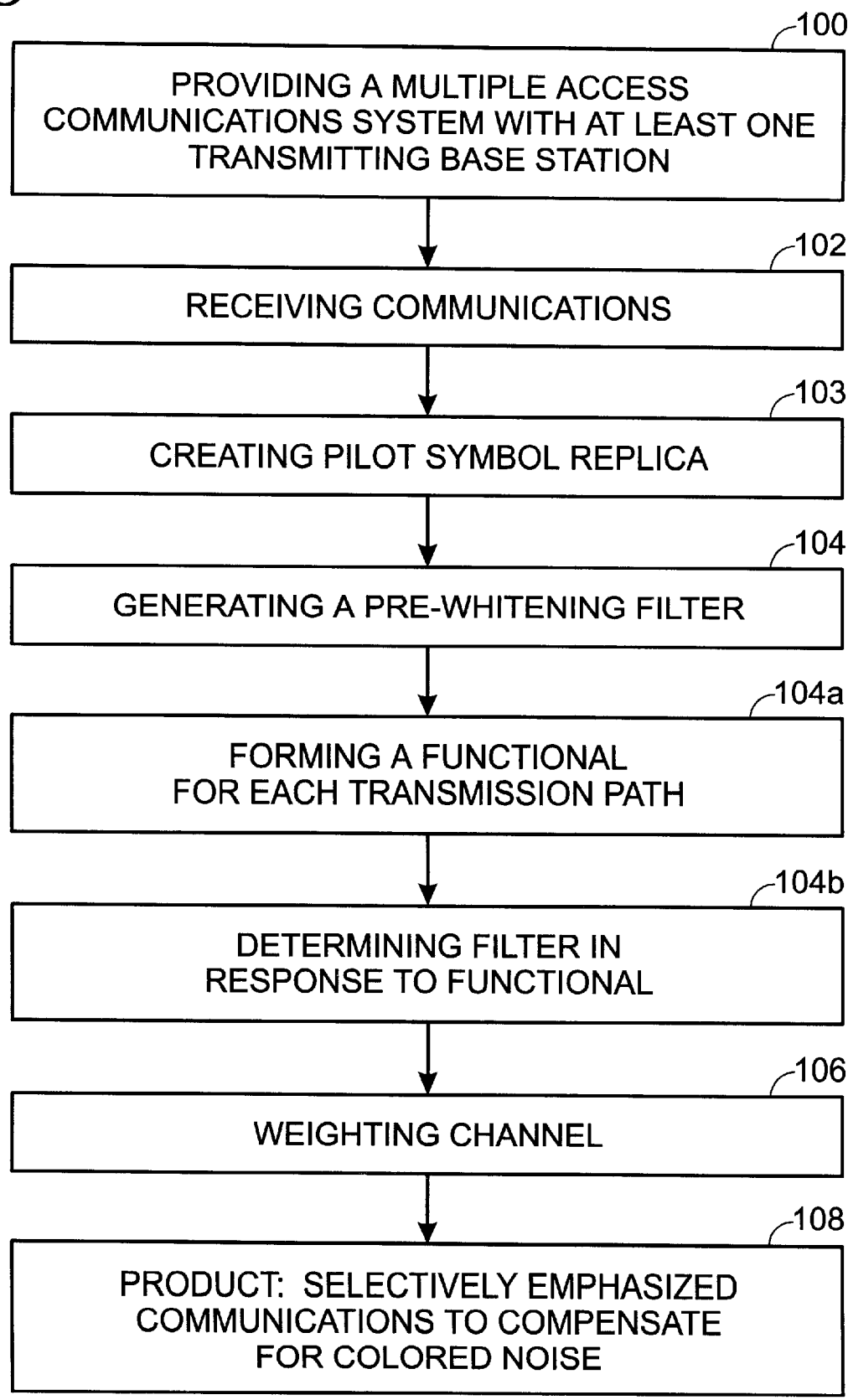
FIG. 4 is a more detailed version of the flowchart of FIG. 3.

FIG. 4 is a more detailed version of the flowchart of FIG. 3. Step 100 provides a multiple access communications system, such as a code division multiple access (CDMA) communication system, including at least one base station transmitting information to a mobile station. Step 102 receives communications including information, colored noise, and white noise. Step 104, in response to the communications received in Step 102, generates a pre-whitening filter to reduce the colored noise. Step 106 performs channel weighting and demodulation of the received communications, filtered in Step 104, to recover the transmitted information. Step 108 is a product, where the received communications are selectively emphasized to compensate for the colored noise.

In some aspects of the invention, Step 106 includes adjusting receiver weighting in response to the pre-whitening filter, whereby the signal to noise ratio of the received communications demodulated in Step 106 is maximized. In some aspects of the invention, Step 104 includes measuring second-order colored noise statistics, and generating the pre-whitening filter in response to the second-order colored noise statistics.

In some aspects of the invention, Step 100 provides that the communications are received along a plurality of transmission paths with corresponding path delays. Then, Step 102 includes resolving the timing of the received communications associated with each transmission path. Step 104 includes the sub-steps of:

a) forming a functional for the transmission paths based on the received noise and the timing of each transmission path resolved in Step 102; and b) in response to the functional formed in Step 104a, determining the pre-whitening filter for the colored noise of each corresponding transmission path.

In some aspects of the invention, Step 100 provides that the transmissions include digital information in the form of bits Step 104a includes optimizing the functional of each transmission path to improve the bit error rate (BER) of the digital information demodulated in Step 106.

Step 104a includes the functional being a signal to noise ratio as follows:

$$J=(\alpha^H f f^H \alpha)/(\alpha^H R \alpha);$$

in which $\alpha$ represents the pre-whitening filter;

in which $(\ )^H$ denotes a conjugate transpose;

in which R is the interference covariance matrix;

in which J is the signal to noise ratio; and in which f is the received communication.

Alternately stated, Step 104a includes the functional as follows:

$$J=\alpha^H R \alpha - \lambda [\alpha^H f - y_0];$$

in which $\alpha$ represents the pre-whitening filter;

in which $(\ )^H$ denotes a conjugate transpose;

in which R is the noise covariance matrix;

in which J is the functional value;

in which $y_0$ is a constant;

in which f is the received communication; and in which $\lambda$ is a non-zero LaGrange multiplier.

In some aspects of the invention, Step 104 includes recursively updating the interference covariance matrix R as follows:

$$R^{-1}_{n+1}=a_1 R^{-1}_n - (a_2 R^{-1}_n u u^H R^{-1}_n)/(1+u^H R^{-1}_n u)$$

in which n represents a discrete sample of time;

in which $R^{-1}_n$ represents the inverse interference covariance matrix at time n;

in which u represents a vector of interference samples at delays corresponding to each transmission path delay; and in which $a_1$ and $a_2$ are positive numbers.

In some aspects of the invention, Step 100 provides that the transmissions includes a pilot signal. Then, Step 102 includes receiving the pilot symbol as part of the received communications. Also, a further step follows Step 102. Step 103, in response to receiving the pilot symbol in Step a), creates a pilot symbol replica. Then, Step 104 includes using the pilot symbol replica to cancel the received pilot signal from received communications and colored noise, whereby the pre-whitening filter is optimized. Step 106 includes subtracting the pilot symbol replica from the received communications to provide a channel estimate without the effects of the pilot symbol, whereby the pilot symbol is filtered as colored noise.

In some aspects of the invention, Step 100 provides that the information is transmitted with a known first chip sequence. Then, Step 104 includes estimating the channel coefficients of each transmission path. Step 103 includes generating the pilot symbol replica using the transmission path timing resolved in Step 102, the first chip sequence, and the channel coefficients estimated in Step 104. Further, Step 104 includes subtracting the pilot symbol replica from the received pilot symbol to generate an error signal. Step 103 includes adaptively filtering the pilot symbol replica, with the use of the error signal to correct the pilot symbol replica, and Step 106 includes improved cancellation of the received pilot symbol with the corrected pilot symbol replica, whereby the colored noise in the received communications is more completely compensated.

In some aspects of the invention, Step 103 includes adaptive filtering by processing the pilot symbol replica through a plurality of processing paths, with each path having a time delay and weight variable in response to the error signal, and summing the processing paths.

A receiver and method have been provided to improve the signal to noise of a received signal in the presence of colored noise. The system and method work to provide an optimal estimation in the despreading of the transmitted information. Further, systems in the receiver cancel the pilot symbol, reducing even further the effect of colored noise in the spreading of transmitted information. Other variations and embodiments will occur to those skilled in the art.

What is claimed is:

1. In a multiple access communication system including at least one base station transmitting to mobile station in a bandwidth that is large compared to the information transmission rate, a method for removing colored noise from received communications wherein the communications are received across a spectrum of frequency bandwidth, comprising the steps of:

a) receiving communications including information, colored noise, and white noise; and
   b) selectively weighting portions of the frequency spectrum when the received communications are despread to emphasize the signal to noise ratio.

2. In a multiple access communication system including at least one base station transmitting to mobile station in a bandwidth that is large compared to the information transmission rate, a method for removing colored noise from received communications comprising the steps of:

a) receiving communications including varying information, colored noise, and white noise components; and,
   b) adaptively modifying a selective weighting process to emphasize the signal to noise ratio, in response to the varying received communications.

3. In a multiple access communication system including at least one base station transmitting to mobile station in a bandwidth that is large compared to the information transmission rate, a method for removing colored noise from received communications comprising the steps of:

a) receiving communications including information, colored noise, and white noise; and
   b) selectively weighting the despread received communications to emphasize the signal to noise ratio as follows:
      b)1) in response to the communications received in Step a), generating a pre-whitening filter to reduce the colored noise; and
      b)2) performing channel weighting and demodulation of the received communications, filtered in Step b)1), to recover the transmitted information, whereby the received communications are selectively emphasized to compensate for the colored noise.

4. A method as in claim 3 is which Step b)2) includes adjusting receiver weighting in response to the pre-whitening filter, whereby the signal to noise ratio of the received communications demodulated in Step b)2) is maximized.

5. A method as in claim 3 in which Step b)1) includes measuring second-order colored noise statistics, and generating the pre-whitening filter in response to the second-order colored noise statistics.

6. A method as in claim 3 wherein the communications are received along a plurality of transmission paths with corresponding path delays, in which Step a) includes resolving the timing of the received communications associated with each transmission path, and in which Step b)1) includes the sub-steps of:

a) forming a functional for the transmission paths based on the received noise and the timing of each transmission path resolved in Step a); and
   b) in response to each functional formed in Step b)1)a), determining the pre-whitening filter for the colored noise of each corresponding transmission path.

7. A method as in claim 6 wherein the transmissions include digital information in the form of bits, and in which Step b)1)a) includes optimizing the functional of each transmission path to improve the bit error rate (BER) of the digital information demodulated in Step b)2).

8. A method as in claim 7 in which Step b)1)a) includes the functional being a signal to noise ratio as follows:

$$J=(\alpha^H f f^H \alpha)/(\alpha^H R \alpha);$$

in which $\alpha$ represents the pre-whitening filter;
in which $(\ )^H$ denotes a conjugate transpose;
in which R is the interference covariance matrix;
in which J is the signal to noise ratio; and
in which f is the received communication.

9. A method as in claim 7 in which Step b)1)a) includes the functional as follows:

$$J=\alpha^H R \alpha - \lambda[\alpha^H f - y_0];$$

in which $\alpha$ represents the pre-whitening filter;
in which $(\ )^H$ denotes a conjugate transpose;
in which R is the noise covariance matrix;
in which J is the functional value;
in which $y_0$ is a constant;
in which f is the received communication; and
in which $\lambda$ is a non-zero LaGrange multiplier.

10. A method as in claim 9 in which Step b)1) includes recursively updating the interference covariance matrix R as follows:

$$R^{-1}_{n+1}=a_1 R^{-1}_n - (a_2 R^{-1}_n u u^H R^{-1}_n)/(1+u^H R^{-1}_n u)$$

in which n represents a discrete sample of time;
in which $R^{-1}_n$ represents the inverse interference covariance matrix at time n;
in which u represents a vector of interference samples at delays corresponding to each transmission path delay; and
in which $a_1$ and $a_2$ are positive numbers.

11. A method as in claim 6 wherein the transmissions includes a pilot signal, in which Step a) includes receiving the pilot symbol as part of the received communications, and including a further step, following Step a), of:

a)1) in response to receiving the pilot symbol in Step a), creating a pilot symbol replica;
   in which Step b)1) includes using the pilot symbol replica to cancel the received pilot signal from received communications and colored noise, whereby the pre-whitening filter is optimized; and
   in which Step b)2) includes subtracting the pilot symbol replica from the received communications to provide a channel estimate without the effects of the pilot symbol, whereby the pilot symbol is filtered as colored noise.

12. A method as in claim 11 wherein the information is transmitted with a known first chip sequence, in which Step b)1) includes estimating the channel coefficients of each transmission path, and in which Step a)1) includes generating the pilot symbol replica using the transmission path timing resolved in Step a), the first chip sequence, and the channel coefficients estimated in Step b)1).

13. A method as in claim 12 in which Step b)1) includes subtracting the pilot symbol replica from the received pilot symbol to generate an error signal, in which Step a)1) includes adaptively filtering the pilot symbol replica, with the use of the error signal to correct the pilot symbol replica, and in which Step b)2) includes improved cancellation of the received pilot symbol with the corrected pilot symbol replica, whereby the colored noise in the received communications is more completely compensated.

14. A method as in claim 13 in which Step a)1) includes adaptive filtering by processing the pilot symbol replica through a plurality of processing paths, with each path having a time delay and weight variable in response to the error signal, and summing the processing paths.

15. In a multiple access communication system including at least one base station transmitting to a mobile station in a bandwidth that is large compared to the information rate with a pilot symbol to aid in synchronization and timing, a receiver for maximizing the signal to noise ratio in the presence of colored noise comprising:

- a pre-whitening filter computer having an input to accept the transmitted communications including information, white noise, and colored noise, and an output to provide the optimal estimation for despreading the information in response to receiving the transmitted information and colored noise;
- a receiver having a first input to accept the transmitted communications including information, white noise, and colored noise, and a second input operatively connected to said pre-whitening filter computer output, said receiver using the optimum estimation vector to provide despread received information at an output, whereby the probability of receiving information is improved;
- a pilot symbol replica generator having an input to accept information to determine the occurrence of the pilot symbols and an output to provide a pilot symbol replica at the same time that an actual pilot symbol is received;
- an autocovariance estimator having a first input to receive the transmitted communications including information, colored noise, and white noise, and an output operatively connected to the input of said pre-whitening filter to provide a covariance matrix of noise statistics;
- a subtractor circuit having a first input to accept the received signal, a second input operatively connected to the output of said pilot symbol replica generator, and an output, operatively connected to the input of said autocovariance estimator to provide the received signal without the pilot symbol; and,
- in which said autocovariance estimator is able to provide a vector in the matrix of noise statistics which effectively filters colored noise from the received signal.

16. A receiver as in claim 15 wherein the information is transmitted on a traffic channel spread with a long code, and predetermined data symbols are transmitted on a pilot channel spread with the long code, for the purposes of channel acquisition and synchronization, the receiver further comprising:

- a finger searcher unit having an input to accept the transmitted pilot channel, and to provide the long code used to despread the channels at an output;
- a tracking loop having a first input operatively connected to said finger searcher output and a second input to receive the transmitted pilot channel, said tracking loop providing a synchronized long code at an output; and
- a pilot channel despreader having a first input to accept the transmitted pilot channel, a second input operatively connected to said tracking loop output, and an output to provide the despread pilot channel.

17. A receiver as in claim 15 in which said autocovariance estimator is able to provide a matrix of noise statistics as follows:

$$R((i-j)T_s) = \frac{1}{K-|i-j|} \sum_{k=1}^{K-|i-j|} r(kT_s + (i-j)T_s)r^*(kT_s)$$

in which

R is the autocovariance estimate;

$T_s$ is the sampling period;

i, and j represent the i-th row and j-th column of the estimated autocovariance matrix;

K represents the number of samples from which the autocovariance is estimated; and and r(t) represents the received communication including information and interference at time t, whereby the i-th row and j-th column in the autocovariance matrix are the estimated values $R((i-j)T_s)$.

18. A receiver as in claim 15 in which said pre-whitening filter computer provides an estimation vector as follows:

α such that $J=(\alpha^H ff^H \alpha)/(\alpha^H R\alpha)$ is maximum;

α such that $J=\alpha^H R\alpha - \lambda[\alpha^H f - y_0]$ is minimum;

and in which α represents the pre-whitening filter;

in which $(\ )^H$ denotes a conjugate transpose;

in which R is the interference covariance matrix;

in which J is the functional;

in which α represents the pre-whitening filter;

in which $y_0$ is a constant;

in which f is the received communication; and in which λ is a non-zero LaGrange multiplier.

* * * * *